March 11, 1924.
W. T. CARLING
VARIABLE SPEED GEARING
Filed March 9, 1923
1,486,565
2 Sheets-Sheet 2
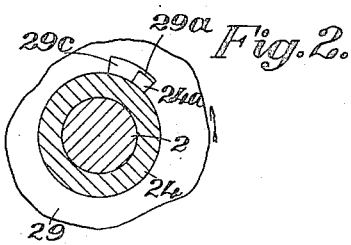
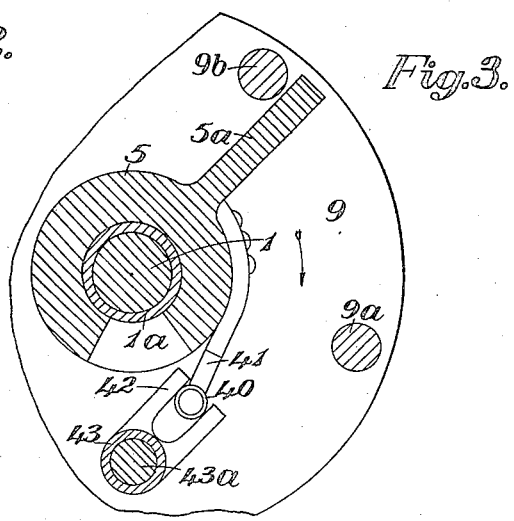
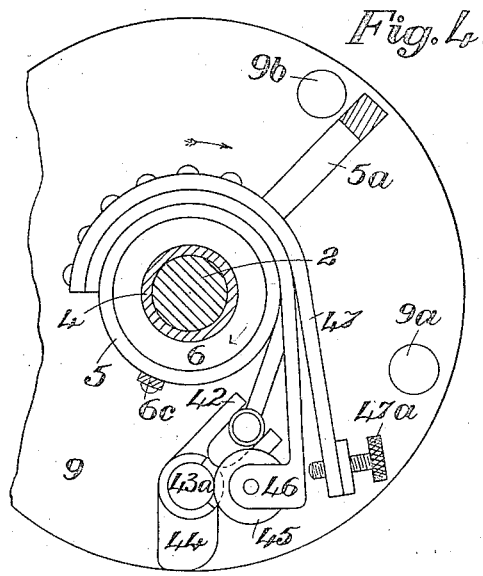
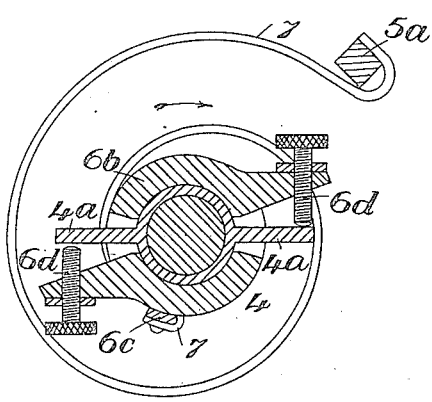
Inventor:-
William T. Carling,
by
Fowler and Smith,
Attorneys.

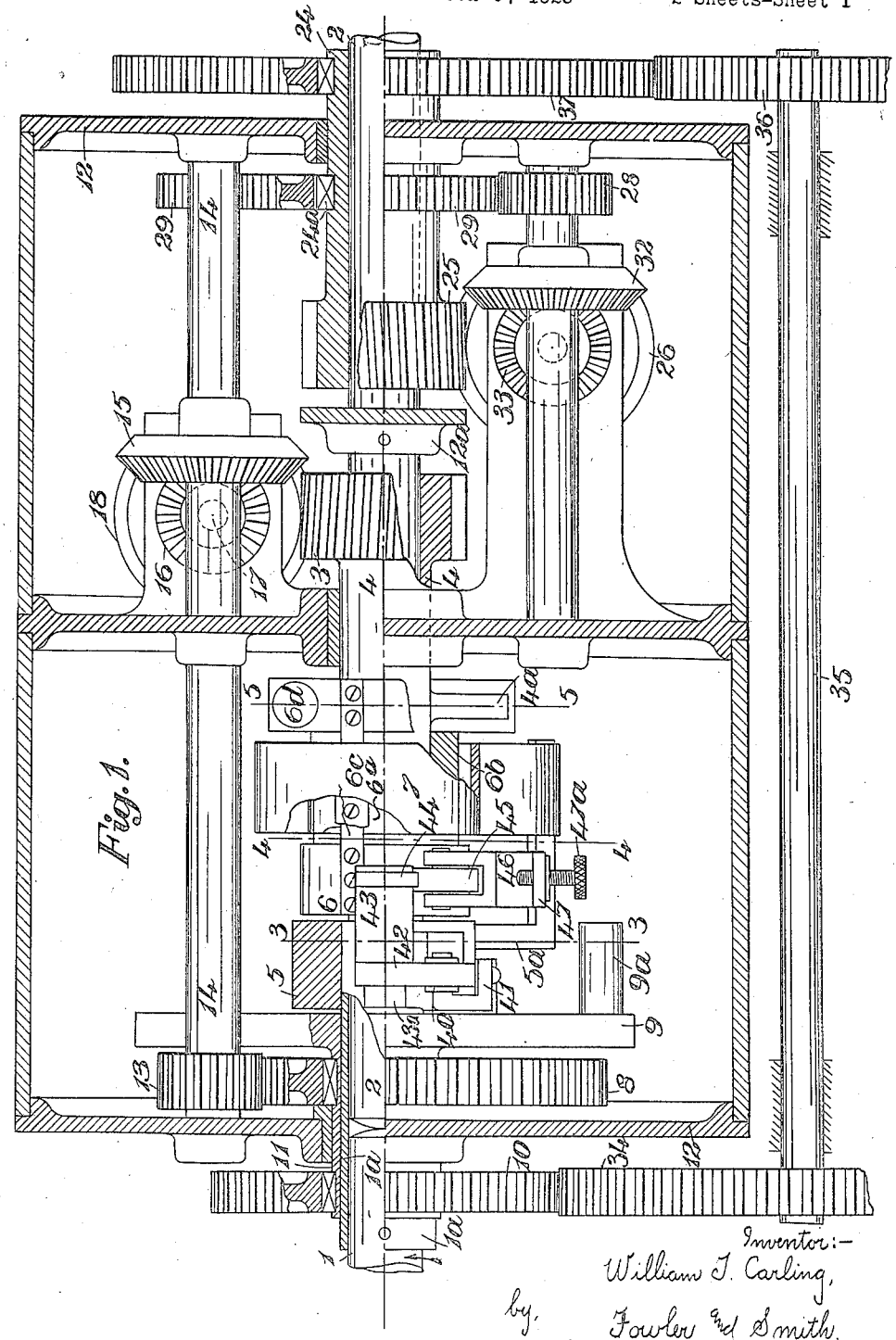

Patented Mar. 11, 1924.

1,486,565

UNITED STATES PATENT OFFICE.

WILLIAM THOMAS CARLING, OF GUILDFORD, ENGLAND.

VARIABLE-SPEED GEARING.

Application filed March 9, 1923. Serial No. 623,926.

*To all whom it may concern:*

Be it known that I, WILLIAM THOMAS CARLING, a British subject, residing at Guildford, in the county of Surrey, England, have invented a certain new and useful Improvement in Variable-Speed Gearing, of which the following is a specification.

This invention relates to toothed gearing in which the relative speeds of the interconnected shafts may be varied to suit the loading or other conditions.

The present invention comprises one or more compound epicyclic gear sets, in each of which two sun wheels mounted upon the same shaft or sleeve are connected by one or more planetary trains of gearing, irreversible mechanism such as worm gear being included at any point or points in the connections between the two sun wheels; thus one sun wheel can be turned so as to revolve the planetary gearing and rotate the second sun wheel, but the second sun wheel can only be driven with the whole planetary mechanism locked.

According to the present invention, I provide one or more sets of such compound epicyclic gears controlling the operation of alternative power transmissions in such a way that when power is applied to one of the sun wheels of one set, these gears lock automatically to transmit the movement through one of said transmissions, but when the driving pressure is removed the gears of this set unlock and permit the desired variation of speed, through the operation of another of said transmissions.

Two or more such compound epicyclic gear sets may be used to control several alternative power transmissions.

The invention is hereafter described with reference to the accompanying drawings, in which:—

Figure 1 represents a variable speed gear providing a direct drive and a reduced speed, the control being automatically effected by means of the torque upon the driven shaft.

Figure 2 is a detail of one of the sun wheels, looking towards the driven end.

Figures 3, 4 and 5 are partial sections on the lines 3—3, 4—4 and 5—5 of Figure 1, looking towards the driving end.

The driving shaft 1 carries fixedly thereon a sleeve $1^a$ into which the driven or tail shaft 2 enters freely within a spigot bearing. The worm or skew gear 3 is fixed upon the sleeve 4 which is rotatable upon the shaft 2, while the collar 5 is fixed upon the sleeve $1^a$.

The collar 6, $6^a$, $6^b$, is revoluble upon the sleeve 4 but is limited in rotation thereon by the lugs $4^a$ contacting with the adjustable screw $6^d$ (Figures 1 and 5).

The automatic control spring consisting of a spiral plate or clock spring 7 is anchored upon the collar 6, $6^a$, $6^b$, by means of a strap $6^c$ (Figures 1 and 5). The sun gear 8, wrist plate 9 and spur gear 10 are all fixed upon the sleeve 11 which is journaled upon the sleeve $1^a$. The housing or cage 12 of the epicyclic gear is mounted upon the sleeves 11, 4 and 24, and is firmly fixed to the tail shaft 2 by means of the central boss $12^a$ upon a transverse web. The planet pinion 13 meshing with the sun wheel 8 is fixed upon the planet axle 14, a bevel gear 15 being also fixed upon this planet axle and meshing with the bevel gear 16 fixed upon the same planet axle 17 as the skew gear or worm wheel 18.

Power is applied to the driving shaft 1 revolving it in the direction shown by the arrow; the sleeve $1^a$ being fixed to this shaft carries with it the collar 5 and arm $5^a$ fixed thereon. This latter in turn winds up the spring 7, the outer end of which is anchored to it. This tends to turn the collar 6 round, the turning moment being conveyed by means of the screws $6^d$ to the lugs $4^a$ and thence through the sleeve 4 to the skew or worm gear sun wheel 3. The latter is so arranged that the angle of its teeth in relation to the axle is such that when pressure is applied to the gear 3 this gear shall lock with its mate 18 when it endeavours to turn it. In consequence of these gears locking, the cage 12 rotates with the driving axle 1, and since the driven shaft 2 is fixed to the planet cage 12, this arrangement gives the effect of a solid or direct drive. These parts form the first compound gear set.

When the load upon the driven shaft reaches a predetermined limit, the yielding of the spring 7 allows the collar 5 to travel in advance of the collar 6 and wrist plate 9, carrying forward the arm 41 fixed into the collar 5, and causing the roller 40 mounted upon the arm 41 to press against the lever 42 fixed upon the sleeve 43; the latter is made to turn upon the pin $43^a$ and in so doing it causes the cam 44 to press back the roller 45 and the spring 46 which is anchored to the collar 6. The movement of the arm 5ª in relation to the wrist plate 9 is limited by stops 9ª, 9ᵇ mounted on the wrist plate.

A supplementary spring 47 may be used to increase the pressure of the spring 46 through the adjusting screw 47ª. When the spring pressure tending to rotate the sleeve 6 backwards against the forward pressure of the spring 7 becomes sufficient, the screws 6ᵈ cease to make contact with the lugs 4ª and in consequence the load is removed from the skew gear or worm 3.

Now the sleeve 43 being mounted upon the pin 43ª fixed in the wrist plate 9, the pressure of the spring 7 is transferred to the wrist plate 9 upon which the sun gear 8 is mounted. This latter tends, by reason of the spring pressure, to move in advance of the cage and in so doing it commences to rotate the planet pinion 13 which carries with it the bevel gear 15 fixed upon the same axle. The bevel gear 15 drives the bevel gear 16 which in turn rotates the skew gear or worm 18, thus preventing the irreversible members 3, 18, from becoming locked; so far as this first set of compound epicyclic gears is concerned, the cage can now either remain still or revolve in either direction in relation to the driving shaft.

The transfer of the spring pressure to the wrist plate 9, which is integral with the gear 10, causes the driving torque to be transmitted to this last mentioned gear wheel, meshing with the gear 34 on the lay shaft 35, thence through the gears 36 and 37 to the sleeve 24, giving the desired reduction.

The second set of compound epicyclic gears, mounted on the sleeve 24 comprises the skew gear sun wheel 25 rigidly fixed to the sleeve, a skew gear or worm 26 carried on the spindle of a bevel pinion 33, meshing with a bevel pinion 32, fixed on the same spindle as a planet pinion 28, and a sun wheel 29 meshing with the latter. The wheel 29 is mounted on the sleeve 24 by means of a key 24ª fitting in a keyway 29ᶜ with a small amount of backlash, as shown at 29ª, in Figure 2, which is a view of the hub as seen from the driving shaft end.

This second epicyclic gear set automatically locks whenever the cage, slowing down in relation to the original driving shaft 1 from which it has been disconnected, reaches the speed of the sleeve 24, the backlash in the keyway 29ᶜ being greater than that in the teeth of the worm gearing 25, 26 increased by the ratio of gears 28, 29, 32, 33.

It will be noted that in changing to a lower gear, the driven shaft does not receive its torque until the driving and driven members have assumed their correct relative speeds.

In normal operation on the direct drive the second epicyclic set works idly, the planet pinion 28 being rotated by running around the sun-wheel 29; this action is possible owing to the absence of clearance at the back of the keyway 29ᶜ between the sun gear 29 and its key 24ª, whereas sufficient backlash or clearance is allowed in the teeth of the locking worm or skew gears 25, 26, to prevent from locking by coming into contact before the gears 28, 29. The ratios of the gears are proportioned to the difference in speed between the cage and the gear wheel 37 which rotates the sleeve 24, so that the worm 26 is revolved at the required speed to prevent it from locking with the wheel 25 which is turning at the reduced speed of the wheel 37.

It is to be understood that the form of my invention herein shown and described is to be taken as a preferred example of the same, and that various changes in the shape, size and arrangement of parts may be resorted to without departing from the spirit of the invention or scope of the subjoined claims.

Having thus described my invention, what I claim is:—

1. A variable speed gearing, comprising driving and driven shafts, alternative means for transmitting power between said driving and driven shafts, an epicyclic gear mechanism forming part of one of said alternative transmitting means, said epicyclic gear mechanism including two co-axial sun gears and planetary members connecting said sun gears, said planetary members comprising an irreversible mechanism, and means for applying driving power to one of said sun gears to lock said irreversible mechanism.

2. Variable speed gearing, comprising driving and driven shafts, alternative means for transmitting power between said driving and driven shafts at different velocity ratios, epicyclic gear mechanism forming part of one of said alternative transmitting means and being mounted upon one of said shafts, said mechanism including two co-axial sun gears and planetary members connecting said sun gears, an irreversible mechanical device comprised in said planetary members, and means for applying driving power to one of said sun gears to lock said irreversible device and transmit power through one of said alternative transmitting means.

3. Variable speed gearing, comprising driving and driven shafts, alternative means for transmitting power between said driving and driven shafts at different velocity ratios, epicyclic gear mechanism forming part of one of said alternative transmitting means and being mounted upon one of said shafts, said mechanism including two co-axial sun gears and planetary members connecting said sun gears, an irreversible mechanical device, comprised in said planetary members, and selective means for applying driving power to one of said sun gears to lock said irreversible device and transmit power through one of said alternative transmitting means or for removing driving pressure from said sun gear so as to unlock said irreversible device, said epicyclic gear mechanism then rotating idly and the power being transmitted through the other of said alternative transmitting means.

4. Variable speed gearing, comprising driving and driven shafts, alternative means for transmitting power between said driving and driven shafts at different velocity ratios, two sets of epicyclic gear mechanism forming part of said alternative transmitting means respectively, each of said sets including two co-axial sun gears and planetary members connecting said sun gears, irreversible mechanical devices comprised in said planetary members, and selective means for applying driving power to one of the sun gears of either of said sets to lock said irreversible device of that set and transmit power through one of said alternative transmitting means, the other of said sets rotating idly with its irreversible mechanical device unlocked.

5. Variable speed gearing comprising co-axial driving and driven shafts, indirect gear for transmitting power from said driving to said driven shafts, epicyclic gear mechanism adapted to transmit power from said driving to said driven shaft, said epicyclic mechanism including two co-axial sun gears and planetry members connecting said sun gears, an irreversible mechanical device comprised in said planetary members, and controlled means for applying driving power to one of said sun gears to lock said irreversible device, said indirect gear then rotating idly.

6. Variable speed gearing, comprising co-axial driving and driven shafts, indirect gear for transmitting power from said driving to said driven shaft, epicyclic gear mechanism forming part of said indirect transmitting gear, said mechanism including two co-axial sun gears and planetary members connecting said sun gears, an irreversible mechanical device comprised in said planetary members, and means for applying driving power to one of said sun gears to lock said irreversible device and transmit power through said indirect gear.

7. Variable speed gearing, comprising driving and driven shafts, alternative means for transmitting power between said driving and driven shafts at different velocity ratios, epicyclic gear mechanism forming part of one of said alternative transmitting means and being mounted upon one of said shafts, said mechanism including two co-axial sun gears and planetary members connecting said sun gears, an irreversible mechanical device comprised in said planetary members, a resilient device through which a limited driving power is applied to one of said sun gears to lock said irreversible device, and means for automatically unlocking said irreversible device when said limited power is exceeded.

8. Variable speed gearing, comprising driving and driven shafts, alternative means for transmitting power between said driving and driven shafts at different velocity ratios, epicyclic gear mechanism forming part of one of said alternative transmitting means and being mounted upon one of said shafts, said mechanism including two co-axial sun gears and planetary members connecting said sun gears, an irreversible mechanical device comprised in said planetary members, and selective means for applying driving power to one of said sun gears to lock said irreversible device and transmit power through one of said alternative transmitting means or for removing driving pressure from said sun gear to unlock said irreversible device, said epicyclic gear mechanism then rotating idly and the power being transmitted through the other of said alternative transmitting means, with means for controlling the operation of said selecting means.

9. Variable speed gearing, comprising driving and driven shafts, alternative means for transmitting power between said driving and driven shafts, two sets of epicyclic gear mechanism forming part of said alternative transmitting means respectively, each of said sets including two co-axial sun gears and planetary members connecting said sun gears, irreversible mechanism comprised in said planetary members, and selective means for applying driving power to one of the sun gears of said sets to lock said irreversible mechanism in said set and transmit power through one of said alternative transmitting means, the other of said transmitting means then rotating idly.

10. In a variable speed gearing, the combination of two epicyclic sun gears, an irreversible mechanical device connecting said sun gears, means for applying driving power to either of said sun gears, and alternative transmissions through which power is conveyed according as one or other of said sun gears receives the drive.

In testimony whereof I hereunto affix my signature.

WILLIAM THOMAS CARLING.